(12) United States Patent
Samarao et al.

(10) Patent No.: US 11,698,444 B1
(45) Date of Patent: Jul. 11, 2023

(54) TECHNIQUES FOR ENHANCING LO AND RX OVERLAP IN FMCW LIDARS USING BIREFRINGENT CRYSTALS

(71) Applicant: AEVA, INC., Mountain View, CA (US)

(72) Inventors: Ashwin Kumar Samarao, Sunnyvale, CA (US); Oguzhan Avci, San Francisco, CA (US); Behsan Behzadi, Sunnyvale, CA (US)

(73) Assignee: Aeva, Inc., Mountain View, CA (US)

( * ) Notice: Subject to any disclaimer, the term of this patent is extended or adjusted under 35 U.S.C. 154(b) by 0 days.

(21) Appl. No.: 17/890,990

(22) Filed: Aug. 18, 2022

(51) Int. Cl.
   *G01S 7/481* (2006.01)

(52) U.S. Cl.
   CPC .......... *G01S 7/4815* (2013.01); *G01S 7/4817* (2013.01)

(58) Field of Classification Search
   None
   See application file for complete search history.

(56) References Cited

U.S. PATENT DOCUMENTS 10,948,598 B1 * 3/2021 Prabhakar ............. G01S 7/4817

FOREIGN PATENT DOCUMENTS

CN           101813776 A *  8/2010  ........... G01N 21/453

* cited by examiner

*Primary Examiner* — Luke D Ratcliffe
(74) *Attorney, Agent, or Firm* — Womble Bond Dickinson (US) LLP

(57) ABSTRACT

A LiDAR system includes an optical source to emit an optical beam, an optical window to reflect a first portion of the optical beam to generate an LO signal, and an optical scanner to transmit a second portion of the optical beam to a target to scan the target to generate a target return signal. The LiDAR system includes a birefringent crystal plate to transmit the LO signal and the target return signal to a PD and shift the LO signal and the target return signal by different displacements to increase a percentage of an overlap of the LO signal and the target return signal on a detection plane of the PD. The LiDAR system includes the PD to mix the target return signal with the LO signal on the detection plane of the PD to generate a heterodyne signal to extract range and velocity information of the target.

18 Claims, 9 Drawing Sheets

TECHNIQUES FOR ENHANCING LO AND RX OVERLAP IN FMCW LIDARS USING BIREFRINGENT CRYSTALS

TECHNICAL FIELD

The present disclosure relates generally to light detection and ranging (LiDAR) systems, and more particularly to using birefringent crystals in frequency modulated continuous-wave (FMCW) LiDAR systems.

BACKGROUND

A FMCW LiDAR system mixes a local oscillator (LO) signal with a target return signal, which is the reflected beam (RX) from a target, to extract range and velocity information. A reflective scanner is used to scan the illumination across a target plane. To increase the frame rate, the scan speed of the scanner is increased. The increased scan speed causes a spatial misalignment of the target signal with respect to the LO signal at the detector. For example, there is an angular separation between the target return signal and the LO signal. This misalignment degrades the spatial mixing efficiency of the target return signal and the LO signal, consequently reducing the overall signal to noise ratio of the LiDAR system.

SUMMARY

The present disclosure describes various examples of LiDAR systems with descan compensation.

In some examples, disclosed herein are an optical subsystem of a LiDAR system and methods for enhancing the overlap of the LO signal and the target return signal (e.g., RX) by inserting a birefringent crystal in front of the photodetector. The birefringent crystal modifies the path of the signals (e.g., beams) traversing through it depending on the angle of incidence of the signals (e.g., beams). For example, the birefringent crystal may shift the LO signal and the target return signal by different displacements. In this way, the overlap between the target return signal and the LO signal may be increased, thereby increasing the coherent mixing efficiency of the LiDAR system. The signal to noise ratio (SNR) of the optical receivers may be increased, and the performance of the LiDAR system may be improved.

In some examples, a LiDAR system is disclosed herein. The LiDAR system includes an optical source to emit an optical beam, an optical window to reflect a first portion of the optical beam to generate a local oscillator (LO) signal, and an optical scanner to transmit a second portion of the optical beam to a target to scan the target to generate a target return signal. The LiDAR system includes a birefringent crystal plate to transmit the LO signal and the target return signal to a photodetector (PD) and shift the LO signal and the target return signal by different displacements to increase a percentage of an overlap of the LO signal and the target return signal on a detection plane of the PD. The LiDAR system includes the PD to mix the target return signal with the LO signal on the detection plane of the PD to generate a heterodyne signal to extract range and velocity information of the target.

In some examples, a method of frequency modulated continuous-wave (FMCW) light detection and ranging is disclosed herein. The method includes emitting an optical beam by an optical source. The method includes reflecting a first portion of the optical beam to generate a local oscillator (LO) signal. The method includes transmitting, by an optical scanner, a second portion of the optical beam to a target to scan the target to generate a target return signal. The method includes transmitting the LO signal and the target return signal to a photodetector (PD) and shifting the LO signal and the target return signal by different displacements by a birefringent crystal plate to increase a percentage of an overlap of the LO signal and the target return signal on a detection plane of the PD. The method further includes mixing, by the PD, the target return signal with the LO signal to extract range and velocity information of the target It should be appreciated that, although one or more embodiments in the present disclosure depict the use of point clouds, embodiments of the present invention are not limited as such and may include, but are not limited to, the use of point sets and the like.

These and other aspects of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and examples, should be viewed as combinable unless the context of the disclosure clearly dictates otherwise.

It will therefore be appreciated that this Summary is provided merely for purposes of summarizing some examples so as to provide a basic understanding of some aspects of the disclosure without limiting or narrowing the scope or spirit of the disclosure in any way. Other examples, aspects, and advantages will become apparent from the following detailed description taken in conjunction with the accompanying figures which illustrate the principles of the described examples.

BRIEF DESCRIPTION OF THE DRAWINGS

For a more complete understanding of various examples, reference is now made to the following detailed description taken in connection with the accompanying drawings in which like identifiers correspond to like elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

The described LiDAR systems herein may be implemented in any sensing market, such as, but not limited to, transportation, manufacturing, metrology, medical, virtual reality, augmented reality, and security systems. According to some embodiments, the described LiDAR system may be implemented as part of a front-end of frequency modulated continuous-wave (FMCW) device that assists with spatial awareness for automated driver assist systems, or self-driving vehicles.

Figure 1A:
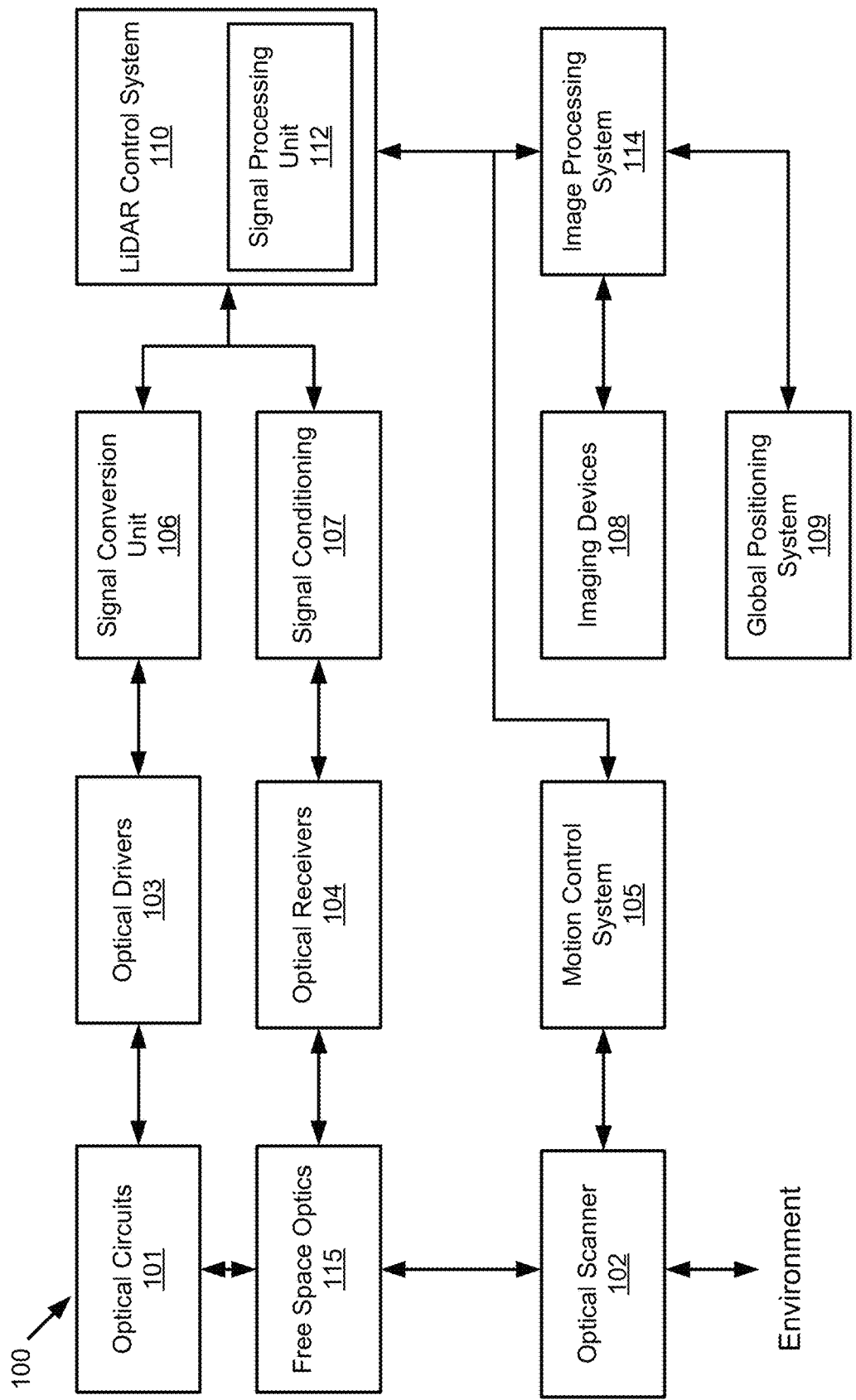
FIG. 1A is a block diagram illustrating an example LiDAR system according to embodiments of the present disclosure.

FIG. 1A illustrates a LiDAR system 100 according to example implementations of the present disclosure. The LiDAR system 100 includes one or more of each of a number of components, but may include fewer or additional components than shown in FIG. 1A. According to some embodiments, one or more of the components described herein with respect to LiDAR system 100 can be implemented on a photonics chip. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles.

In some examples, the LiDAR system 100 includes an optical scanner 102 that includes one or more scanning mirrors that are rotatable along an axis (e.g., a slow-moving-axis) that is orthogonal or substantially orthogonal to the fast-moving-axis of the diffractive element to steer optical signals to scan a target environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coating window or the like.

To control and support the optical circuits 101 and optical scanner 102, the LiDAR system 100 includes LiDAR control systems 110. The LiDAR control systems 110 may include a processing device for the LiDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LiDAR control systems 110 may include a signal processing unit 112 such as a digital signal processor (DSP). The LiDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LiDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LiDAR control systems 110 to signals interpretable by the galvanometers in the optical scanner 102. In some examples, a motion control system 105 may also return information to the LiDAR control systems 110 about the position or operation of components of the optical scanner 102. For example, an analog-to-digital converter may in turn convert information about the galvanometers' position or angle to a signal interpretable by the LIDAR control systems 110.

The LiDAR control systems 110 are further configured to analyze incoming digital signals. In this regard, the LiDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LiDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LiDAR control systems 110. In some examples, the signals from the optical receivers 104 may be subject to signal conditioning by signal conditioning unit 107 prior to receipt by the LiDAR control systems 110. For example, the signals from the optical receivers 104 may be provided to an operational amplifier for amplification of the received signals and the amplified signals may be provided to the LIDAR control systems 110.

In some applications, the LiDAR system 100 may additionally include one or more imaging devices 108 configured to capture images of the environment, a global positioning system 109 configured to provide a geographic location of the system, or other sensor inputs. The LiDAR system 100 may also include an image processing system 114. The image processing system 114 can be configured to receive the images and geographic location, and send the images and location or information related thereto to the LiDAR control systems 110 or other systems connected to the LIDAR system 100.

In operation according to some examples, the LiDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LiDAR control systems 110. The LiDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LiDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 1B:
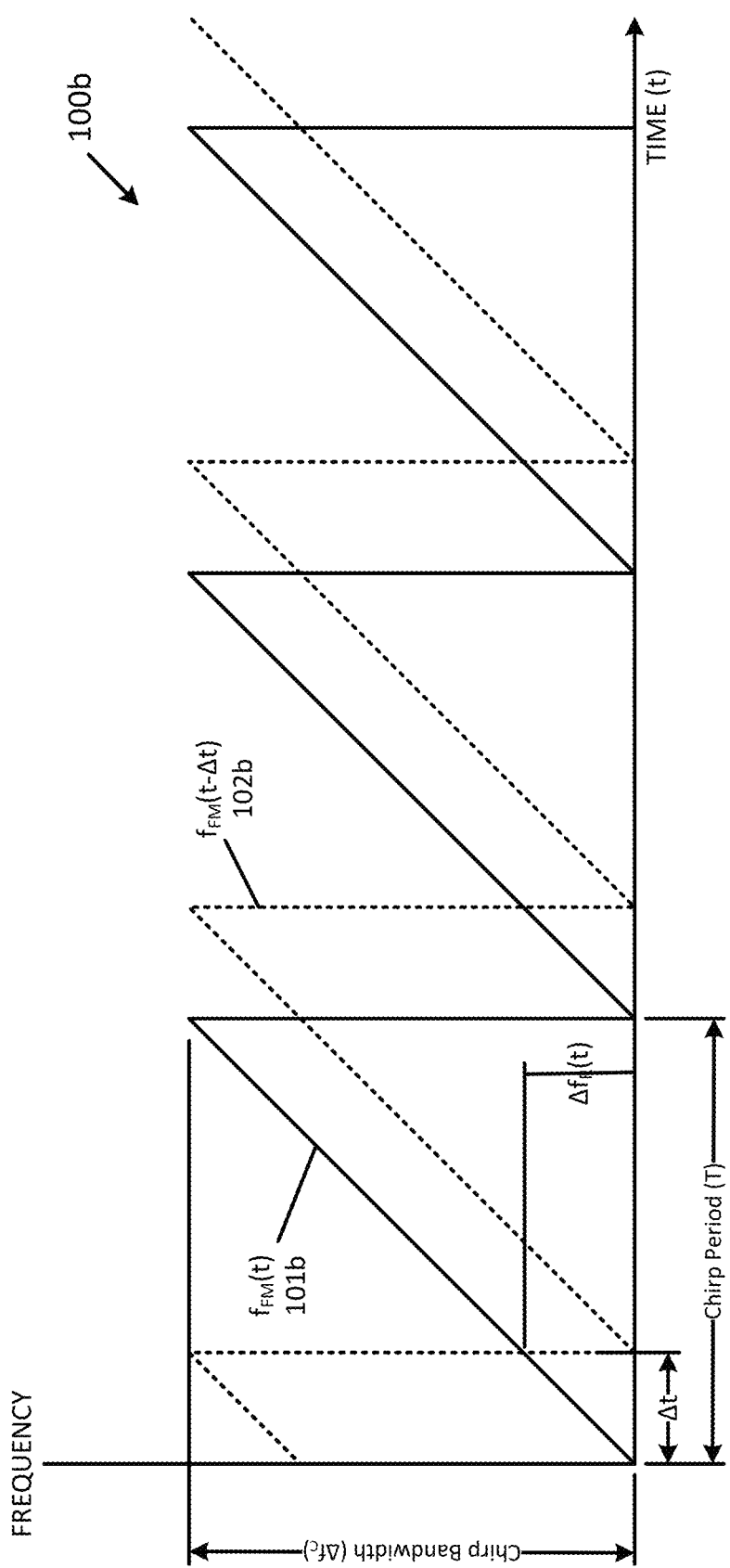
FIG. 1B is a time-frequency diagram illustrating an example of FMCW LIDAR waveforms according to embodiments of the present disclosure.

FIG. 1B is a time-frequency diagram 100b of an FMCW scanning signal 101b that can be used by a LiDAR system, such as system 100, to scan a target environment according to some embodiments. In one example, the scanning waveform 101b, labeled as $f_{FM}(t)$, is a sawtooth waveform (sawtooth "chirp") with a chirp bandwidth $\Delta f_C$ and a chirp period $T_C$. The slope of the sawtooth is given as $k=(\Delta f_C/T_C)$. FIG. 1B also depicts target return signal 102b according to some embodiments. Target return signal 102b, labeled as $f_{FM}(t-\Delta t)$, is a time-delayed version of the scanning signal 101b, where $\Delta t$ is the round trip time to and from a target illuminated by scanning signal 101b. The round trip time is given as $\Delta t=2R/v$, where R is the target range and v is the velocity of the optical beam, which is the speed of light c. The target range, R, can therefore be calculated as $R=c(\Delta t/2)$. When the return signal 102b is optically mixed with the scanning signal, a range-dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 102b will, in general, also includes a frequency offset (Doppler shift) if the target has a velocity relative to the LIDAR system 100. The Doppler shift can be determined separately, and used to correct the frequency of the return signal, so the Doppler shift is not shown in FIG. 1B for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{Rmax}$) is 500 megahertz. This limit in turn determines the maximum range of the system as $R_{max}=(c/2)(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 1C:
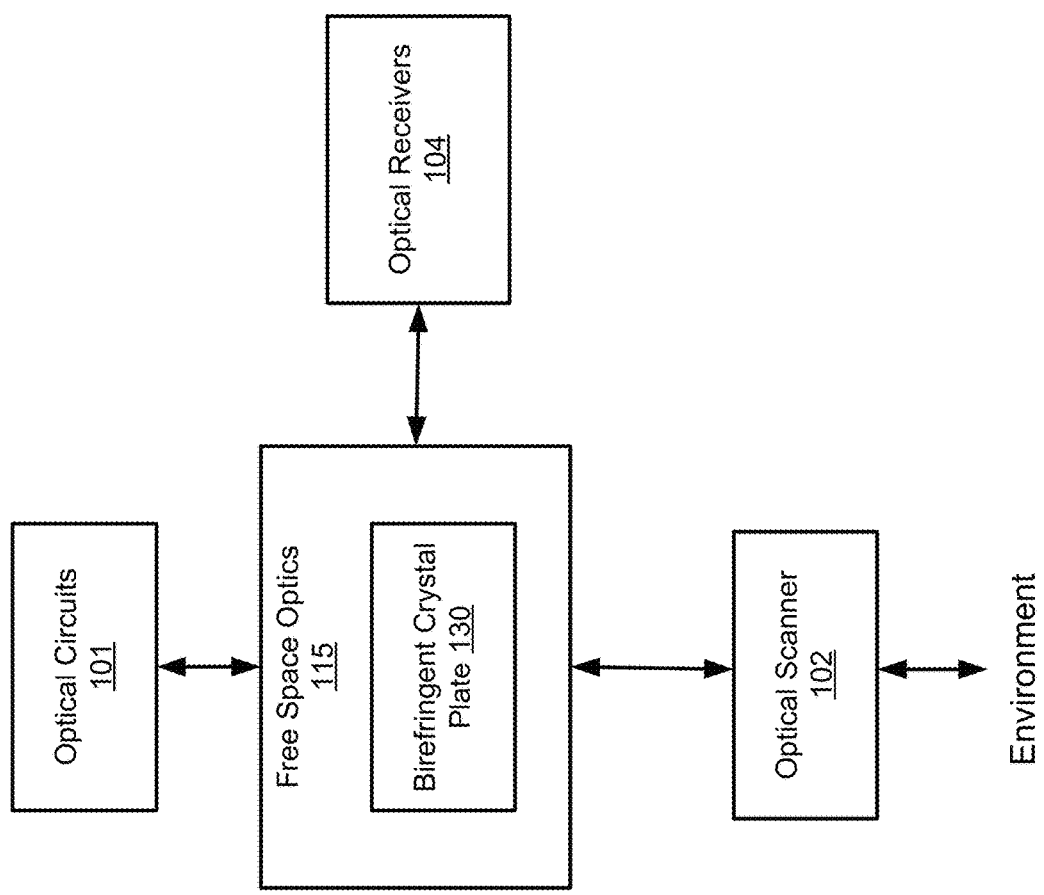
FIG. 1C is a block diagram illustrating an example free space optics of a LiDAR system with a birefringent crystal plate according to embodiments of the present disclosure.

FIG. 1C is a block diagram illustrating an example free space optics 115 of the LiDAR system 100 with a birefringent crystal plate 130 according to embodiments of the present disclosure. Referring to FIG. 1C, the birefringent crystal plate 130 may be disposed in front of a photodetector (e.g., one of the optical receivers 104) to enhance the overlap of the LO signal and the target return signal. The birefringent crystal plate 130 modifies the path of the LO signal and the target return signal traversing through it depending on the angles of incidence of the LO signal and the target return signal, which will be discussed in details below in connection with FIGS. 5A-5B. For example, the birefringent crystal may use materials such as Yttrium orthovanadate (YVO4), tellurium dioxide (TeO2), natural crystals like Calcite, etc., to shift the LO signal and the target return signal by different displacements. In this way, the overlap between the target return signal and the LO signal may be increased, thereby increasing the coherent mixing efficiency of the LiDAR system. The signal to noise ratio (SNR) of the optical receivers may be increased, and the performance of the LiDAR system may be improved.

Figure 2B:
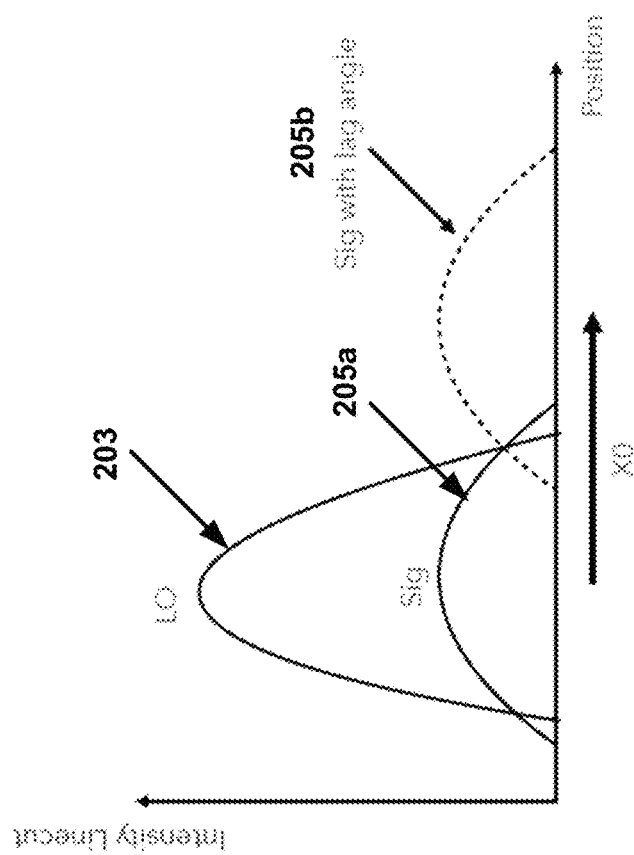
FIG. 2B is a diagram illustrating an example of intensity profile at a detection plane of a LiDAR system without descan compensation according to embodiments of the present disclosure.
Figure 2A:
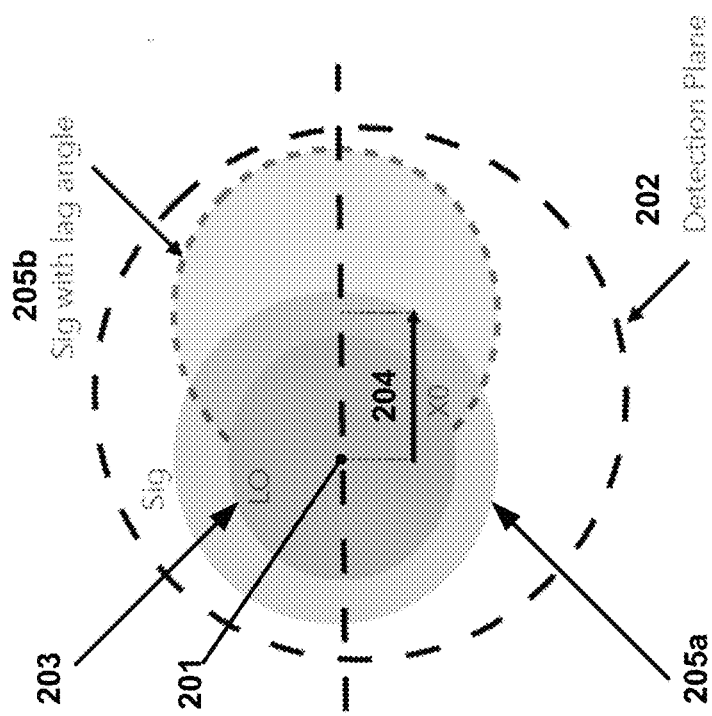
FIG. 2A is a diagram illustrating an example of a detection plane of a LiDAR system without descan compensation according to embodiments of the present disclosure.

FIG. 2A is a diagram illustrating an example of a detection plane 201 of a LiDAR system without descan compensation according to embodiments of the present disclosure. FIG. 2B is a diagram illustrating an example of intensity profile at the detection plane 201 of the LiDAR system without descan compensation according to embodiments of the present disclosure. Currently, fast-scanning mirrors may be used to illuminate a scene in LIDAR systems. For example, one scanning mirror may scan fast along the X direction (horizon), while another scanning mirror scans may slow along the Y direction (elevation). The collected light has an altered frequency signature that is used to extract range information. As discussed above, the signal processing unit 112 (as illustrated in FIG. 1A) may generate a 3D point cloud with information about range and velocity of the target.

To increase the frame rate, while maintaining the same number of points per frame, usually the scan speed of the scanning mirror (e.g., in one direction) is increased. During the time the optical beam propagates to the distant target and returns to the scanning system, the orientation of the scanning mirror changes due to a high scan speed (e.g., high rotational velocity) of the scanning mirror. Thus, the increased scan speed causes a spatial misalignment of the target signal with respect to the LO signal at the detector of the LiDAR system. This misalignment may severely degrade the spatial mixing efficiency of the target return signal and the LO signal, consequently reducing the overall signal to noise ratio of the LIDAR system. For example, when the scan speed of the scanning mirror is faster than 100 Hz at long ranges (>3000 degrees per second), the spatial mixing efficiency can be severely degraded.

Referring to FIG. 2A and FIG. 2B, a LiDAR system (e.g., LiDAR system 100 in FIG. 1A) may include an optical subsystem with an optical axis 201. For example, as shown in FIG. 2A, a LO signal 203 and a target return signal 205a may be designed to overlap at a detection plane 202 of an optical receiver (e.g., one of optical receivers 104 in FIG. 1A). The LO signal 203 and the target return signal 205a may be designed to align around the optical axis 201. However, due to a high scan speed of a scanning mirror, the target return signal 205b may have a lag angle at the detection plane 202. As depicted in FIG. 2B, the intensity profile of the actual target return signal 205b may be shifted with the lag angle. With a high scan speed of the scanning mirror, a spatial misalignment 204 of the actual target return signal 205b with respect to the LO signal 203 may occur at the detector plane 202 of the LiDAR system. The spatial misalignment reduces the overall signal to noise ratio of the LIDAR system. As an example, a descan may refer to the target return signal being shifted with an angle at the detector plane, e.g., due to the high scan speed. The FMCW LiDAR system mixes the target return signal and the LO to extract the range and velocity information, hence the performance of the FMCW LiDAR system is based on the ability to combine the two signals. Moreover, for fast scanning LiDAR systems, the descan may rapidly degrade the signal to noise ratio (SNR) of the optical receiver due to the spatial displacement of the target return signal and the LO signal at the detection plane. There is a need to maximum the overlap between the target return signal and the LO signal in order to maximize the coherent mixing efficiency.

Figure 3B:
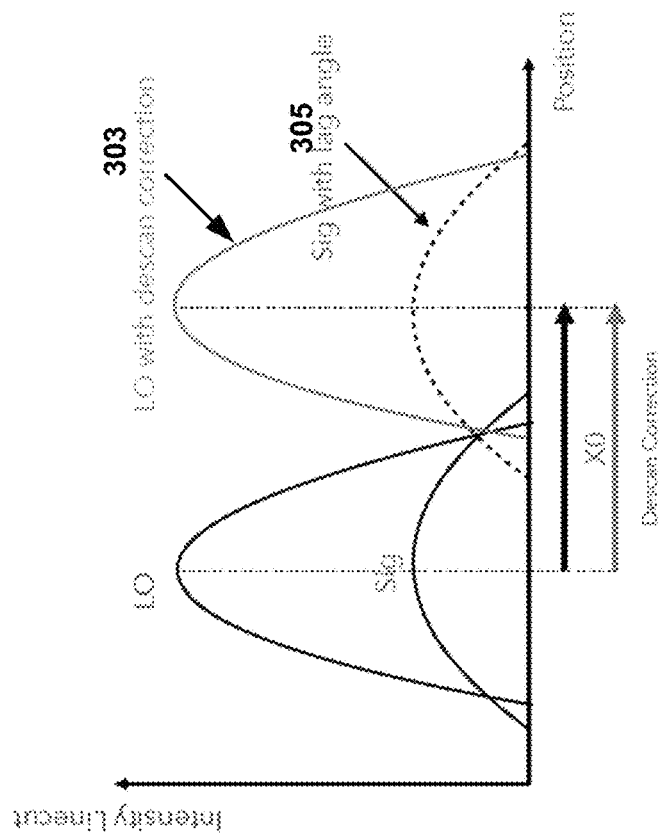
FIG. 3B is a diagram illustrating an example of intensity profile at a detection plane of a LiDAR system with descan compensation using a birefringent crystal plate according to embodiments of the present disclosure.
Figure 3A:
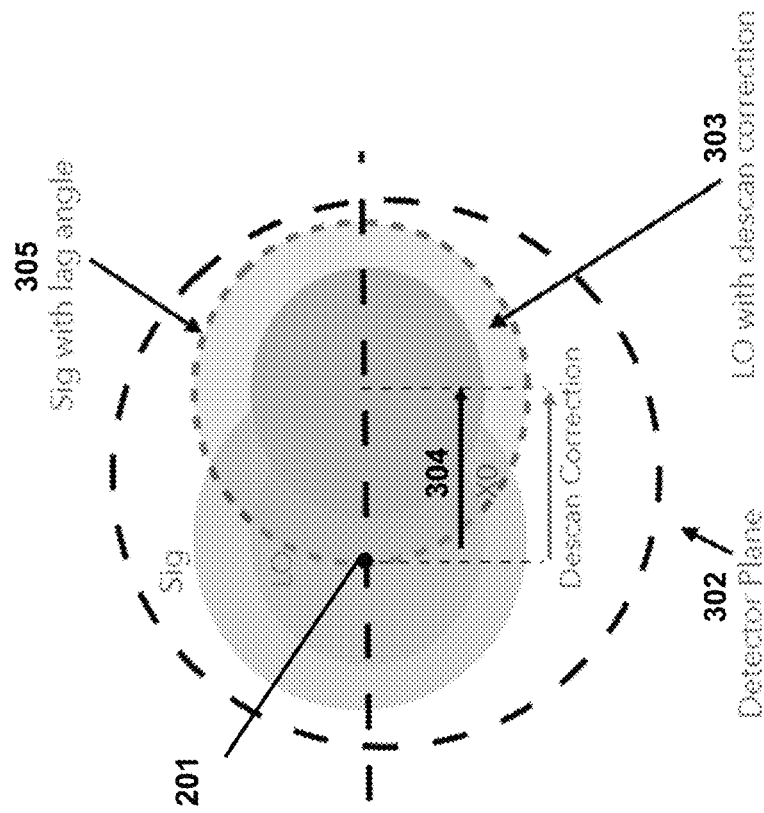
FIG. 3A is a diagram illustrating an example of a detection plane of a LiDAR system with descan compensation using a birefringent crystal plate according to embodiments of the present disclosure.

FIG. 3A is a diagram illustrating an example of a detection plane 301 of a LiDAR system with descan compensation using birefringent crystal plate according to embodiments of the present disclosure. FIG. 3B is a diagram illustrating an example of intensity profile at the detection plane 301 of the LiDAR system with descan compensation using a birefringent crystal plate according to embodiments of the present disclosure. Referring to FIG. 3A and FIG. 3B, an optical subsystem of a LiDAR system (e.g., the system 100 in FIG. 1A) is configured to mitigate signal losses due to the lag-angle descan through the corrections such as using a birefringent crystal plate, as will be explained in greater detail herein below. Through the birefringent crystal plate, both an LO signal with descan correction 303 and a target return signal 305 are shifted at the detection plane 301 of an optical receiver (e.g., one of the optical receivers 104). Due to the optical property of the birefringent crystal plate (which will be discussed in detail below), the LO signal 303 has a significantly larger sensitivity to the corrections relative to the target return signal 305. As illustrated in FIG. 3A, the LO signal 303 has a shift 304 due to the corrections which is much larger than a shift (not shown) of the target return signal 305. For example, the shift 304 of the signal 303 may be close to the misalignment 204. Thus, the misalignment between the LO signal 303 and the target return signal 305 may be compensated.

The magnitude of the corrections may be determined by the severity of the lag-angle descan. The displacement magnitude and direction may be tuned to accommodate different descan conditions. For example, the displacement magnitude and direction may be determined based on the scan speed of the scanning mirror. In this fashion, the overlap between the target return signal 305 and the LO signal 303 may be increased, thereby increasing the coherent mixing efficiency of the LiDAR system, e.g., for a fast scanning LiDAR system. The signal to noise ratio (SNR) of the optical receivers may be increased, and the performance of the LiDAR system may be improved.

Figure 4B:
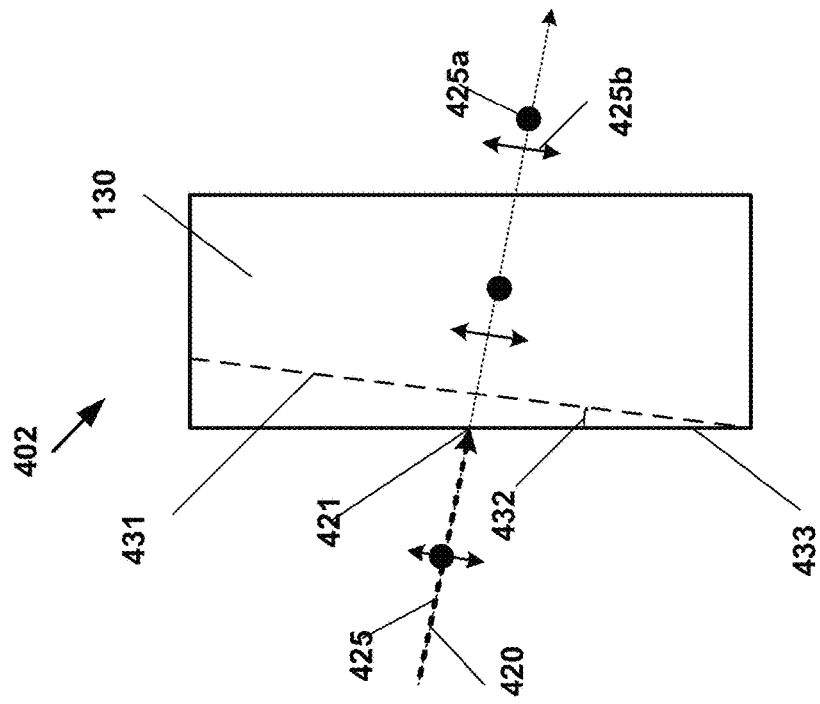
FIGS. 4A-4B are diagrams illustrating an example of a cross section of a birefringent crystal plate, according to embodiments of the present disclosure.
Figure 4A:
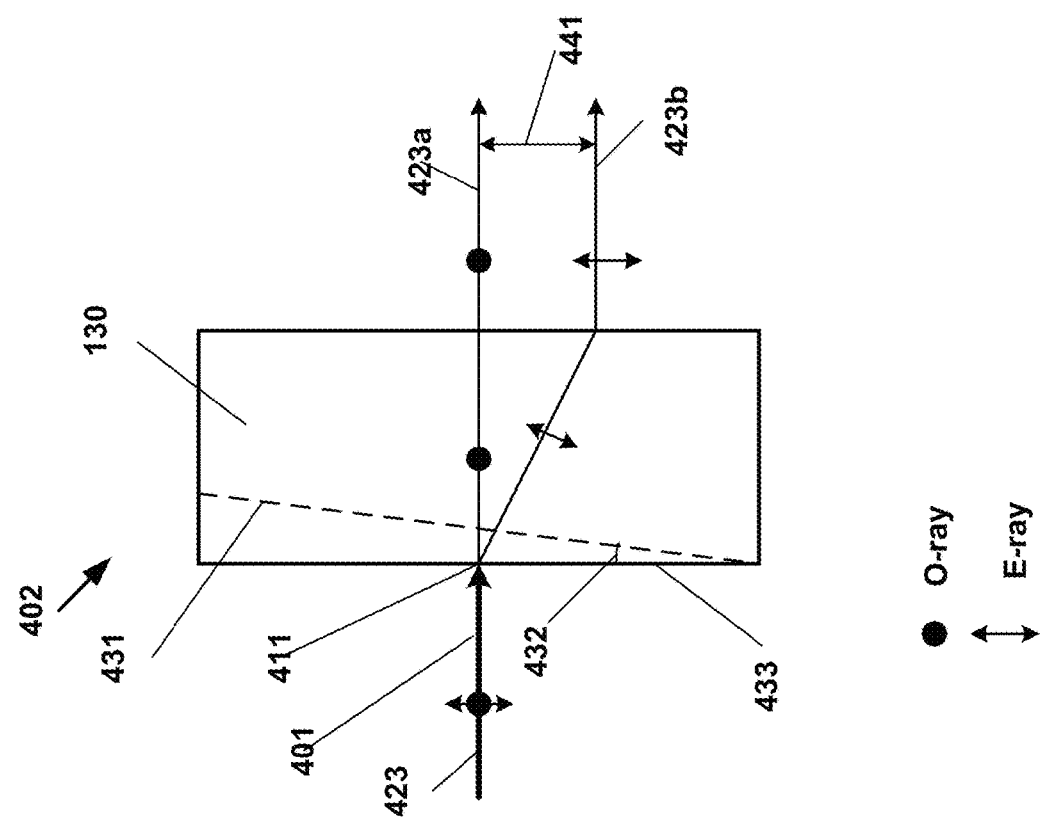

FIGS. 4A-4B are diagrams illustrating an example of a cross section 402 of a birefringent crystal plate 130, according to embodiments of the present disclosure. As shown in FIGS. 4A-4B, the birefringent crystal plate 130 may include a birefringent crystal material that includes two indices of refraction (e.g., an ordinary ray or O-ray, an extraordinary ray, E-ray). In these scenarios, the O-ray and E-ray can be defined based on the orientation of their electric fields with respect to an optical axis of the birefringent crystal plate 130. For example, an optic axis of a crystal is a direction in which a ray of transmitted light suffers no birefringence or "double refraction." In some scenarios, the birefringent crystal plate 130 may have an optical axis 431, which is disposed to have an angle 432 with respect to a front surface 433 of the birefringent crystal plate 130 on the cross-section 400, as illustrated in FIGS. 4A-4B.

Referring to FIG. 4A, a light beam (e.g., an LO signal 423) may propagate along an optical axis 401 of an optical system, and incident at a location 411 on the front surface 433 of the birefringent crystal plate 130, with an angle of 90 degrees with respect to the front surface. The LO signal 423 may include an O-ray component 423a and an E-ray component 423b. As illustrated in FIG. 4A, the electric field of the O-ray component 423a may be perpendicular to the cross section 402 of the birefringent crystal place 130 (in-out of the page); the electric field of the E-ray component 423b may be parallel to the cross section 402 of the birefringent crystal plate 130 (parallel to the page). The LO signal 423 may experience double refraction when the polarization of the E-ray component 423b is not parallel to the optical axis 431 of the birefringent crystal plate 130. For example, as illustrated in FIG. 4A, the polarization of the E-ray component 423b may be parallel to the front surface 433 of the birefringent crystal plate 130 and have the angle 432 with respect to the optical axis 431 of the birefringent crystal plate 130. The O-ray component 423a may continue to propagate along the optical axis 401, while the E-ray component 423b may exit the birefringent crystal plate 130 with a lateral displacement 441, relative to the path of the E-ray component 423b before incident on the birefringent crystal plate 130. After exiting the birefringent crystal plate 130, the E-ray component 423b may propagate in a direction parallel to the direction 401 before incident on the birefringent crystal plate 130, but with the lateral displacement 441 in a direction perpendicular to the direction 401.

Referring to FIG. 4B, another light beam, for example, a target return signal 425, may propagate with an angle with respect to the optical axis 401, for example, due to descan as discussed above. The target return signal 425 may incident at a location 421 on the front surface 433 of the birefringent crystal plate 130, with an angle not 90 degrees with respect to the front surface. The target return signal 425 may include an O-ray component 425a and an E-ray component 425b. As illustrated in FIG. 4B, the electric field of the O-ray component 425a may be perpendicular to the cross section 402 of the birefringent crystal plate 130 (in-out of the page); the electric field of the E-ray component 425b may be parallel to the cross section 402 of the birefringent crystal plate 130 (parallel to the page).

The polarization of the E-ray component 425b may be configured to propagate along a direction 420. As an example, the direction 420 may be parallel to the optical axis 431 of the birefringent crystal plate 130, as illustrated in FIG. 4B. Thus, there may be no double refraction. The E-ray component 425b may only have only a retardation from the O-ray component 425a. The E-ray component 423b may exit the back surface of the birefringent crystal plate 130 without a lateral displacement, relative to the path of the E-ray component 425b before incident on the birefringent crystal plate 130. By using the birefringent crystal plate 130 in a LiDAR system in the manner described herein, the misalignment of the LO signal and the target return signal may be compensated.

Figure 5A:
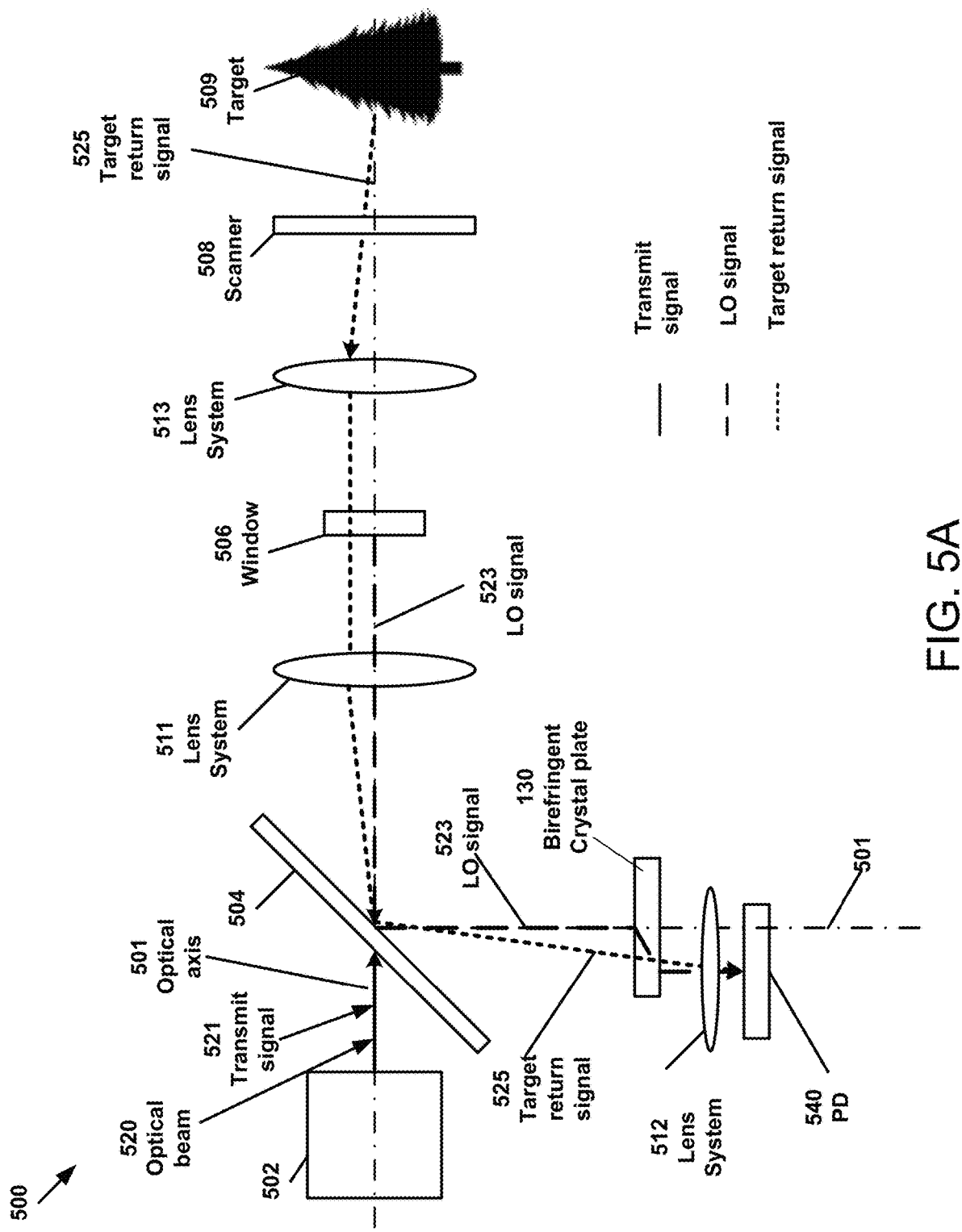
FIGS. 5A-5B are block diagrams illustrating an example of an optical subsystem of a LiDAR system using a birefringent crystal plate according to embodiments of the present disclosure.
Figure 5B:
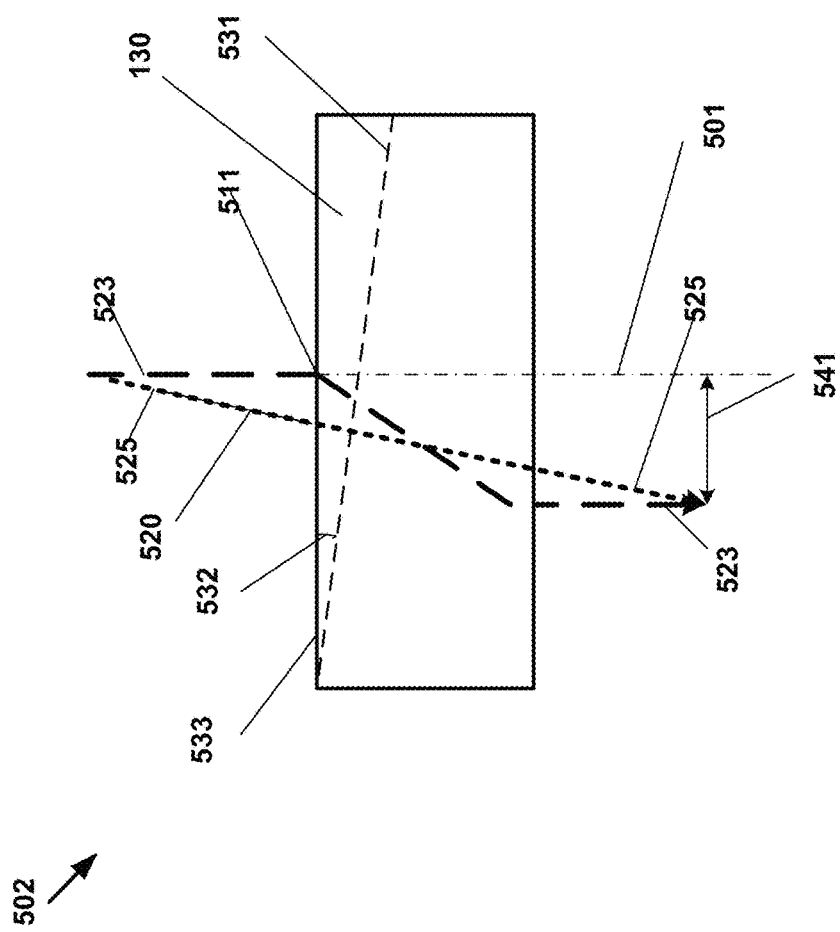

FIGS. 5A-5B are block diagrams illustrating an example of an optical subsystem 500 of a LiDAR system using the birefringent crystal plate 130 according to embodiments of the present disclosure. The LiDAR system may be the LiDAR system 100 as illustrated in FIG. 1A. The optical subsystem 500 may include components from optical circuits 101, free space optics 115, optical scanners 102, and optical receivers 104. The optical subsystem 500 may include an optical source 502 (e.g., located in the optical circuits 101). The optical subsystem 500 may include a beam splitter (BS) 504 (or a polarizing beam splitter (PBS)), a lens system 511, an optical window 506, a lens system 512 and a lens system 513, which may be components of the free space optics 115 or the optical circuits 101. The optical subsystem 500 may include an optical scanner 508, which may include one of the optical scanners 102. The optical subsystem 500 may include a photodetector (PD) 540, which may include one of the optical receivers 104.

The optical subsystem 500 may have an optical axis 501 to align the multiple optical components.

Referring to FIG. 5A and FIG. 5B, the optical source 502 emits an optical beam 520. In a transmission path, the optical beam is a transmit signal 521. The optical beam 520 passes through the beam splitter (BS) 504 (or a polarizing beam splitter (PBS)) and then is focused on the optical window 506, which may be a partially reflective window plate. For the PBS case, a polarizing wave-plate or a Faraday rotator may be used to alter the reflected polarization from the optical window 506.

The optical window 506 may transmit a portion of the optical beam 520 towards a target 509, and reflect a portion of the optical beam 520, to generate an LO signal 523. The transmit signal 521 may pass through the optical window 506, and be collimated by using a lens system 513. Then, the transmit signal 521 may propagate to the optical scanner 508, and transmit to the target 509 to scan the target.

The LO signal 523, which may be the reflected light from the optical window 506, is imaged on a detection plane of the PD 540. The reflected light from the target 509 forms a target return signal 525. The target return signal 525 is imaged on the PD 540 as well. The coherent mixing between the LO signal 523 and the target return signal 525 generates a radio frequency (RF) beat tone.

The optical beam 520 incident on the lens system 511 may be focused on the optical window 406, e.g., at a reflective surface, which may be either the front or back LO-generating surface capable of retro-reflecting light. In the case of a stationary scanner, the target return signal path experiences no descan and is therefore coaxial with the LO signal path. As discussed above, when the scanner increases in speed, without descan compensation, the LO signal path and the target return signal path begin to depart and consequently deteriorate the mixing efficiency on the detector.

Referring to FIG. 5A and FIG. 5B, the birefringent crystal plate 130 may be disposed in the optical system 500 before the PD540. The lens system 512 may be inserted between the birefringent crystal plate 130 and the PR 540 to focus the LO signal 523 and the target return signal 525 to the PD 540. The birefringent crystal plate 130 may have an optical axis 531, which is disposed to have an angle 532 with respect to the front surface 533 of the birefringent crystal plate 130 on a cross-section 502. As an example, the angle 532 may be 0.1, 1, 5, 10, 20, 30, 45 degrees or any values there between. The angle 532 may have other values as well. For example, the extraordinary ray of the birefringent crystal plate 130 is in the same polarization of the LO signal 523 and the target return signal 525. Thus, the LO signal 523 and the target return signal 525 may refer only to the E-ray components of the LO signal 523 and the target return signal 525.

FIG. 5B illustrates the cross section 502 of the birefringent crystal plate 130. Referring to FIG. 5B, the LO signal 523 may propagate along the optical axis 501 of the optical system 500, and incident on the front surface 533 of the birefringent crystal plate 130, with an angle of 90 degrees with respect to the front surface. The polarization of the E-ray component 523*b* may be parallel to the front surface 533 of the birefringent crystal plate 130 and have the angle 532 with respect to the optical axis 531 of the birefringent crystal plate 130. The LO signal 523 may exit the birefringent crystal plate 130 with a lateral displacement 541, relative to the path of the LO signal 523 before incident on the birefringent crystal plate 130. After exiting the birefringent crystal plate 130, the LO signal 523 may propagate in a direction parallel to the direction 501 before incident on the birefringent crystal plate 130, but with the lateral displacement 541 in a direction perpendicular to the direction 401. The PD 540 may be disposed to align with the lateral displacement 541 of the LO signal 523.

The target return signal 525, may propagate with an angle with respect to the optical axis 501, for example, due to descan as discussed above. The target return signal 525 may incident on the front surface 533 of the birefringent crystal plate 130, with an angle not 90 degrees with respect to the front surface. The target return signal 525 may be configured to propagate along the direction 520. As an example, the direction 520 may be parallel to the optical axis 531 of the birefringent crystal plate 130, as illustrated in FIG. 5B. Thus, there may be no double refraction. The target return signal 525 may exit the back surface of the birefringent crystal plate 130 without a lateral displacement, relative to the path of the target return signal 525 before incident on the birefringent crystal plate 130. For another example, the target return signal 525 may be configured to have an angle (not shown) smaller than the angle 532 with respect to the optical axis 531 (which is between the LO signal 523 and the optical axis 531). The target return signal 525 may exit the birefringent crystal plate 130 with a lateral displacement (not shown), relative to the path of the target return signal 525 before incident on the birefringent crystal plate 130. After exiting the birefringent crystal plate 130, the target return signal 525 may propagate in a direction parallel to the direction 520 (the direction before incident on the birefringent crystal plate 130), but with the lateral displacement, which is smaller than the lateral displacement 541, in a direction perpendicular to the direction 520.

When the LO signal 523 incident normal (with the angle of 90 degrees) on the birefringent crystal plate 130, the LO signal 523 may experience the most displacement ('decenter'). The target return signal 525 from a further target may be descanned more, and hence may be incident on the birefringent crystal plate 130 at an angle further way from the angle of 90 degrees and hence experience less displacement, and may fall on the 'decentered' LO signal 523 on the PD 540. Thus, an overlap between the target return signal 525 and the LO signal 523 on the PD 540 is increased, as illustrated in FIG. 5B. By using the birefringent crystal plate 130 in the LiDAR system 500, the misalignment of the LO signal and the target return signal may be compensated.

As an example, the angle 532 with respect to the front surface 533 of the birefringent crystal plate 130 on the cross-section 502 may correspond to the scan speed of the scanner 508. The higher the scan speed, the larger the angle 532. The magnitude and direction of the angle 532 may be tuned to accommodate different descan conditions. In this way, the overlap between the target return signal 525 and the LO signal 523 may be increased, and the effects of the lag-angle descan may be compensated, thereby improving the performance of the LiDAR system.

Figure 6:
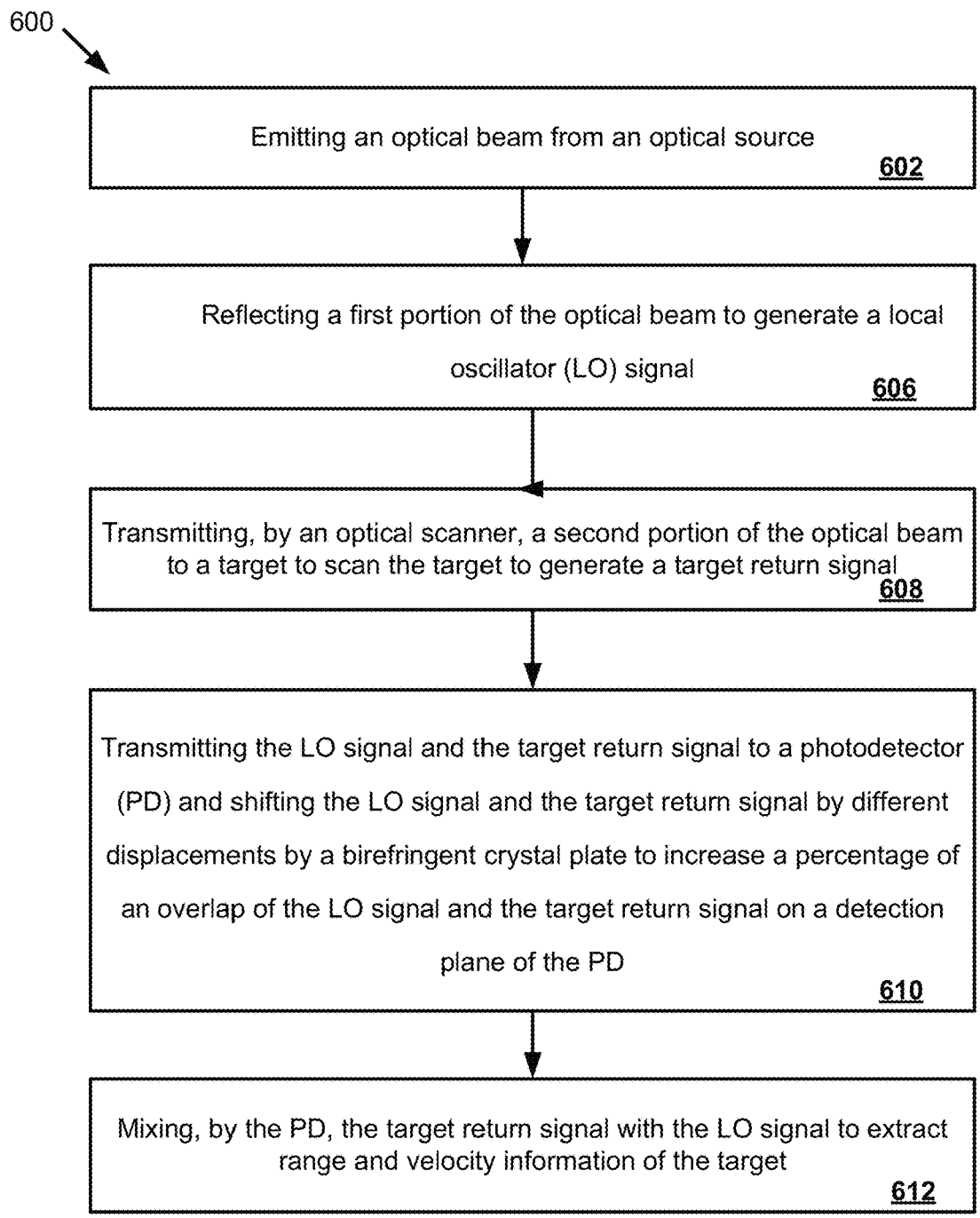
FIG. 6 is a flow diagram illustrating an example of a method of descan compensation using a birefringent crystal plate in a LiDAR system according to embodiments of the present disclosure.

FIG. 6 is a flow diagram illustrating an example of a method of descan compensation using a birefringent crystal plate in a LiDAR system according to embodiments of the present disclosure. Referring to FIG. 6, at block 602, the method includes emitting an optical beam by an optical source. At block 606, the method includes reflecting a first portion of the optical beam to generate a local oscillator (LO) signal. At block 608, the method includes transmitting, by an optical scanner, a second portion of the optical beam to a target to scan the target to generate a target return signal. At block 610, the method includes transmitting the LO signal and the target return signal to a photodetector (PD) and shifting the LO signal and the target return signal by different displacements by a birefringent crystal plate to increase a percentage of an overlap of the LO signal and the target return signal on a detection plane of the PD. At block 812, the method further includes mixing, by the PD, the target return signal with the LO signal to extract range and velocity information of the target.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operations may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A frequency modulated continuous-wave (FMCW) light detection and ranging (LiDAR) system, comprising:
   an optical source to emit an optical beam;
   an optical window to reflect a first portion of the optical beam to generate a local oscillator (LO) signal;
   an optical scanner to transmit a second portion of the optical beam to a target to scan the target to generate a target return signal;
   a birefringent crystal plate to transmit the LO signal and the target return signal to a photodetector (PD) and shift the LO signal and the target return signal by different displacements to increase a percentage of an overlap of the LO signal and the target return signal on a detection plane of the PD, wherein an optical axis of the birefringent crystal plate is disposed to create a first angle with respect to a front surface of the birefringent crystal plate on a cross-section, and wherein the first angle is determined based on a scan speed of the optical scanner; and
   the PD to mix the target return signal with the LO signal on the detection plane of the PD to extract range and velocity information of the target.

2. The FMCW LiDAR system of claim 1, further comprising an optical lens between the birefringent crystal plate and the PD to focus the target return signal and the LO signal on the detection plane of the PD.

3. A frequency modulated continuous-wave (FMCW) light detection and ranging (LiDAR) system, comprising:
   an optical source to emit an optical beam;
   an optical window to reflect a first portion of the optical beam to generate a local oscillator (LO) signal;
   an optical scanner to transmit a second portion of the optical beam to a target to scan the target to generate a target return signal;
   a birefringent crystal plate to transmit the LO signal and the target return signal to a photodetector (PD) and shift the LO signal and the target return signal by different displacements to increase a percentage of an overlap of the LO signal and the target return signal on a detection plane of the PD, wherein an optical axis of the birefringent crystal plate is disposed to create a first angle with respect to a front surface of the birefringent crystal plate on a cross-section, and wherein the first angle is determined based on a distance of the target; and
   the PD to mix the target return signal with the LO signal on the detection plane of the PD to extract range and velocity information of the target.

4. The FMCW LiDAR system of claim 3, further comprising an optical lens between the birefringent crystal plate and the PD to focus the target return signal and the LO signal on the detection plane of the PD.

5. A frequency modulated continuous-wave (FMCW) light detection and ranging (LiDAR) system, comprising:
   an optical source to emit an optical beam;
   an optical window to reflect a first portion of the optical beam to generate a local oscillator (LO) signal;
   an optical scanner to transmit a second portion of the optical beam to a target to scan the target to generate a target return signal;
   a birefringent crystal plate to transmit the LO signal and the target return signal to a photodetector (PD) and shift the LO signal and the target return signal by different displacements to increase a percentage of an overlap of the LO signal and the target return signal on a detection plane of the PD, wherein the LO signal is to incident on a front surface of the birefringent crystal plate with an angle of 90 degrees, and to exit a back surface of the birefringent crystal plate with a first lateral displacement relative to a path of the incident LO signal; and
   the PD to mix the target return signal with the LO signal on the detection plane of the PD to extract range and velocity information of the target.

6. The FMCW LiDAR system of claim 5, wherein the target return signal is to incident on the front surface of the birefringent crystal plate with an angle different than 90 degrees, and to exit the back surface of the birefringent crystal plate with a second lateral displacement relative to a path of the incident target return signal.

7. The FMCW LiDAR system of claim 6, wherein the second lateral displacement is smaller than the first lateral displacement.

8. The FMCW LiDAR system of claim 6, wherein the PD is disposed to align with the first lateral displacement of the LO signal.

9. The FMCW LiDAR system of claim 5, further comprising an optical lens between the birefringent crystal plate and the PD to focus the target return signal and the LO signal on the detection plane of the PD.

10. A method of frequency modulated continuous-wave (FMCW) light detection and ranging (LiDAR), comprising:
    emitting an optical beam by an optical source;
    reflecting a first portion of the optical beam to generate a local oscillator (LO) signal;
    transmitting, by an optical scanner, a second portion of the optical beam to a target to scan the target to generate a target return signal;
    transmitting the LO signal and the target return signal to a photodetector (PD) and shifting the LO signal and the target return signal by different displacements by a birefringent crystal plate to increase a percentage of an overlap of the LO signal and the target return signal on a detection plane of the PD, wherein an optical axis of the birefringent crystal plate is disposed to create a first angle with respect to a front surface of the birefringent crystal plate on a cross-section, and wherein the first angle is determined based on a scan speed of the optical scanner; and
    mixing, by the PD, the target return signal with the LO signal to extract range and velocity information of the target.

11. The method of claim 10, wherein the transmitting the LO signal and the target return signal to a PD comprises:
    transmitting the LO signal and the target return signal to an optical lens between the birefringent crystal plate and the PD to focus to the target return signal and the LO signal on the detection plane of the PD.

12. A method of frequency modulated continuous-wave (FMCW) light detection and ranging (LiDAR), comprising:
    emitting an optical beam by an optical source;
    reflecting a first portion of the optical beam to generate a local oscillator (LO) signal;

transmitting, by an optical scanner, a second portion of the optical beam to a target to scan the target to generate a target return signal;

transmitting the LO signal and the target return signal to a photodetector (PD) and shifting the LO signal and the target return signal by different displacements by a birefringent crystal plate to increase a percentage of an overlap of the LO signal and the target return signal on a detection plane of the PD, wherein an optical axis of the birefringent crystal plate is disposed to create a first angle with respect to a front surface of the birefringent crystal plate on a cross-section, and wherein the first angle is determined based on a distance of the target; and mixing, by the PD, the target return signal with the LO signal to extract range and velocity information of the target.

13. The method of claim 12, wherein the transmitting the LO signal and the target return signal to a PD comprises:

transmitting the LO signal and the target return signal to an optical lens between the birefringent crystal plate and the PD to focus to the target return signal and the LO signal on the detection plane of the PD.

14. A method of frequency modulated continuous-wave (FMCW) light detection and ranging (LiDAR), comprising:

emitting an optical beam by an optical source;

reflecting a first portion of the optical beam to generate a local oscillator (LO) signal;

transmitting, by an optical scanner, a second portion of the optical beam to a target to scan the target to generate a target return signal;

transmitting the LO signal and the target return signal to a photodetector (PD) and shifting the LO signal and the target return signal by different displacements by a birefringent crystal plate to increase a percentage of an overlap of the LO signal and the target return signal on a detection plane of the PD, wherein the LO signal is to incident on the front surface of the birefringent crystal plate with an angle of 90 degrees, and to exit a back surface of the birefringent crystal plate with a first lateral displacement relative to a path of the incident LO signal; and mixing, by the PD, the target return signal with the LO signal to extract range and velocity information of the target.

15. The method of claim 14, wherein the target return signal is to incident on the front surface of the birefringent crystal plate with an angle different than 90 degrees, and to exit the back surface of the birefringent crystal plate with a second lateral displacement relative to a path of the incident target return signal.

16. The method of claim 15, wherein the second lateral displacement is smaller than the first lateral displacement.

17. The method of claim 15, wherein the PD is disposed to align with the first lateral displacement of the LO signal.

18. The method of claim 14, wherein the transmitting the LO signal and the target return signal to a PD comprises:

transmitting the LO signal and the target return signal to an optical lens between the birefringent crystal plate and the PD to focus to the target return signal and the LO signal on the detection plane of the PD.

* * * * *